US008320909B2

(12) United States Patent
Ramasamy et al.

(10) Patent No.: US 8,320,909 B2
(45) Date of Patent: Nov. 27, 2012

(54) EXPANDED CELL SEARCH AND SELECTION IN A MOBILE WIRELESS DEVICE

(75) Inventors: Venkatasubramanian Ramasamy, San Jose, CA (US); Giri Prassad Deivasigamani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 12/950,865

(22) Filed: Nov. 19, 2010

(65) Prior Publication Data

US 2011/0319076 A1    Dec. 29, 2011

Related U.S. Application Data

(60) Provisional application No. 61/358,340, filed on Jun. 24, 2010.

(51) Int. Cl.
*H04W 4/00* (2009.01)
(52) U.S. Cl. ........ 455/434; 455/436; 455/437; 455/443; 455/444; 370/331; 370/332; 370/328; 370/311; 370/329
(58) Field of Classification Search .................. 455/434, 455/436, 437, 443, 444; 370/331, 332, 328, 370/311, 329
See application file for complete search history.

(56) References Cited

U.S. PATENT DOCUMENTS

| 2003/0218995 | A1* | 11/2003 | Kim et al. ..................... 370/318 |
| 2007/0004445 | A1  | 1/2007  | Dorsey et al. |
| 2008/0057948 | A1  | 3/2008  | Mittal et al. |
| 2008/0182615 | A1* | 7/2008  | Xue et al. .................. 455/552.1 |
| 2009/0088160 | A1  | 4/2009  | Pani et al. |
| 2009/0247157 | A1  | 10/2009 | Yoon et al. |
| 2010/0002611 | A1  | 1/2010  | Umatt et al. |
| 2010/0008323 | A1  | 1/2010  | Deshpande et al. |
| 2010/0014454 | A1* | 1/2010  | Reddy et al. ................ 370/328 |
| 2010/0190494 | A1* | 7/2010  | Lee ............................. 455/434 |
| 2012/0015648 | A1* | 1/2012  | Roberts et al. ............. 455/426.1 |
| 2012/0129537 | A1* | 5/2012  | Liu et al. .................... 455/444 |

FOREIGN PATENT DOCUMENTS

GB        2 420 937 A     6/2006
(Continued)

OTHER PUBLICATIONS

Fiore et al., "Cell Reselection Parameter Optimization in UMTS," $2^{nd}$ International Symposium Wireless Communication Systems, 2005. Sep. 7, 2005, pp. 50-53.

(Continued)

*Primary Examiner* — Ajit Patel
*Assistant Examiner* — Khai M Nguyen
(74) *Attorney, Agent, or Firm* — Gazdzinski & Associates, PC

(57) ABSTRACT

A method and apparatus for expanded cell search and selection in a mobile wireless device. The mobile device locates cells in a first of neighbor cells and in a second list of stored cells and evaluates located cells using suitability criteria. When locating a suitable first cell that uses a first radio access technology (RAT) in the first list, the first cell is selected. When locating a second suitable cell that uses a second RAT in the first list and not locating a suitable cell that uses the first RAT in the second list, the second cell is selected. When locating a third suitable cell that uses the second RAT in the first list and locating a fourth suitable cell that uses the first RAT in the second list, the fourth cell is selected when more suitable than the third cell.

23 Claims, 6 Drawing Sheets

FOREIGN PATENT DOCUMENTS

| GB | 2420937 A | * | 6/2006 |
|---|---|---|---|
| WO | WO 02/093955 A1 | | 11/2002 |
| WO | WO2008/131591 | | 11/2008 |

OTHER PUBLICATIONS

Meshkati et al., "Mobility and Capacity Offload for 3G UMTS Femtocells," IEEE Global Telecommunications Conference, 2009, Nov. 30-Dec. 4, 2009, pp. 1-7.

Garavaglia et al., "Inter-System Cell Reselection Parameter Optimization in UMTS," IEEE 16$^{th}$ International Symposium on Personal, Indoor and Mobile Radio Communications, Sep. 11-14, 2005, pp. 1636-1640.

International Search Report dated Sep. 6, 2011 in PCT Application No. PCT/U52011/036066.

Written Opinion dated Sep. 6, 2011 in PCT Application No. PCT/U52011/036066.

* cited by examiner

EXPANDED CELL SEARCH AND SELECTION IN A MOBILE WIRELESS DEVICE

CROSS-REFERENCE TO RELATED APPLICATIONS

This patent application takes priority under 35 U.S.C. 119 (e) to U.S. Provisional Patent Application Ser. No. 61/358,340 entitled, "METHOD AND APPARATUS FOR EXPANDED CELL SEARCH AND SELECTION IN A MOBILE WIRELESS DEVICE" by Ramasamy et al. filed Jun. 24, 2010 which is incorporated by reference herein in its entirety for all purposes.

TECHNICAL FIELD

The described embodiments relate generally to wireless mobile communications. More particularly, a method is described for expanded cell search and selection in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located within the cell. The radio network subsystem provides an "air interface" through which the mobile wireless communication device can access the wireless communication network. Whether idle or actively connected, a mobile wireless communication device can be associated with a "serving" cell in a wireless communication network and be aware of "neighbor" cells to which the mobile wireless communication device can also associate. The quality of the air interface between the mobile wireless communication device and the radio network subsystem can vary based on the distance between them, which directly affects received signal power, and on interference included in received signals at either end of the air interface. As the mobile wireless communication device moves further away from the radio network subsystem, eventually a neighbor cell can provide an equal or better performing communication link than the current serving cell. The mobile wireless communication device can include a process for determining if and when to switch cells with which it associates. If the mobile wireless communication device is actively connected to the serving cell, then the process of switching to a neighbor cell is known as "handoff." For a mobile wireless communication device that is associated with a serving cell in an "idle" state, the process of associating with a neighbor cell is known as "cell reselection."

When a mobile wireless communication device seeks to associate with a wireless communication network, such as after a power on initialization, the mobile wireless communication device can search for cells located in its vicinity. Initially locating and connecting to a serving cell by a mobile wireless communication device can be referred to as "cell selection". (The terms "cell selection" and "cell reselection" can be used interchangeably herein, and no limitation is intended by the use of one or the other term.) If a cell is located that is deemed suitable to provide a wireless communication link, e.g. when signals received by the mobile wireless communication device from the radio network subsystem located in the cell exceeds certain performance quality metrics, then the mobile wireless communication device can associate with that cell. The mobile wireless communication device can be referred to as being "camped" on a particular "serving" cell in the wireless communication network of cells. While camped on the serving cell, the mobile wireless communication device can listen to messages broadcast from the serving cell's radio network subsystem as well as from other radio network subsystems located in neighbor cells. System information that specifies certain properties of the serving cell and its neighbor cells can be broadcast regularly by the serving cell's radio network subsystem. If the mobile wireless communication device determines that a neighbor cell can provide a higher quality communication link than a current serving cell, then the mobile wireless communication device can disassociate from the current serving cell and associate with the neighbor cell.

Cell reselection and handover can occur between cells that share a common radio access technology (RAT), such as between two cells in a third generation (3G) Universal Mobile Telecommunication System (UMTS) wireless communication network. In certain circumstances, the mobile wireless communication device can perform an inter-RAT handover (or cell reselection), such as from a 3G UMTS network to a second generation (2G) Global System for Mobile Communications (GSM) network. The mobile wireless communication device can be aware of neighbor cells that use the same radio access technology and of other neighbor cells that use a different radio access technology based on the system information broadcast by the serving cell. Information about certain cells, such as home or office based "femto-cells" that have limited coverage area, however, can be not broadcast by the radio network subsystems of the wireless communication network. Thus, using only the neighbor cells broadcast by the serving cell during handover and cell reselection can limit options for reselection by the mobile wireless communication device, even when the mobile wireless communication device has separate knowledge of "non-broadcast" cells not listed in broadcast system information messages. For example, the mobile wireless communication device can be aware of limited coverage "femto-cells" through a discovery process, such as when searching for cells upon initialization or when recovering from an out-of-service (OOS) condition. Information about the femto-cells can be stored locally in the mobile wireless communication device to use during cell reselection and handover. A femto-cell, if available, can provide benefits for both the user of the mobile wireless communication device (high data rates) and the wireless communication network operator (network offloading). Thus a method to expand a cell search and cell reselection to include stored cells in addition to broadcast cells can be desired.

SUMMARY OF DESCRIBED EMBODIMENTS

This paper describes various embodiments that relate to methods and apparatus for expanded cell search and selection by a mobile wireless communication device in a wireless communication network.

In a representative embodiment, a method comprises the following steps performed by a mobile wireless communication device. The mobile wireless communication device searches for and locates cells in a first list of neighbor cells and in a second list of stored cells. The mobile wireless communication device evaluates the located cells using suitability criteria. When locating a suitable first cell that uses a first radio access technology in the first list of neighbor cells, the mobile wireless communication device selects the first cell. Otherwise, when locating a suitable second cell that uses a second radio access technology in the first list of neighbor cells and not locating a suitable cell that uses the first radio access technology in the second list of stored cells, the mobile wireless communication device selects the second cell. Otherwise, when locating a suitable third cell that uses the second radio access technology in the first list of neighbor cells, and locating a suitable fourth cell that uses the first radio access technology in the second list of stored cells, the mobile wireless communication device selects the fourth cell, when the fourth cell is more suitable than the third cell. In some embodiments, the first radio access technology is a 3G UMTS or later generation technology and the second radio access technology is a 2G GSM technology.

In another representative embodiment, an apparatus for expanded cell search and selection in a wireless communication network includes at least the following elements. The apparatus includes an application processor configured to provide an application service. The apparatus also includes a transceiver. The transceiver is configured to detect a loss of service condition. The transceiver is configured to search for and locate cells in a first of neighbor cells and a second list of stored cells. The transceiver is configured to evaluate located cells using suitability criteria. The transceiver is configured to select a suitable first cell that uses a first radio access technology in the second list of stored cells when not locating a suitable cell that uses the first radio access technology in the first list of neighbor cells, and when locating a suitable second cell that uses a second radio access technology in the first list of neighbor cells, the second cell being inferior to the first cell. In some embodiments, the first radio access technology is preferred to the second radio access technology.

In yet another representative embodiment, a non-transitory computer readable medium for storing non-transitory computer program code executable by a processor in a mobile wireless device for searching for and selecting a suitable cell includes the following non-transitory computer program code. Non-transitory computer program code for locating cells in a first list of neighbor cells and in a second list of stored cells and for evaluating located cells using suitability criteria. Non-transitory computer program code for selecting a suitable first cell in the second list stored cells, the first suitable cell using a first radio access technology, when no suitable cell that uses the first radio access technology is found from the first list of neighbor cells, and when the first suitable cell from the second list of stored cells outperforms all suitable cells found from the first list of neighbor cells. In some embodiments, the first suitable cell is a private cell with characteristics not broadcast by an overlapping macro cell and having limited transmission coverage range.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
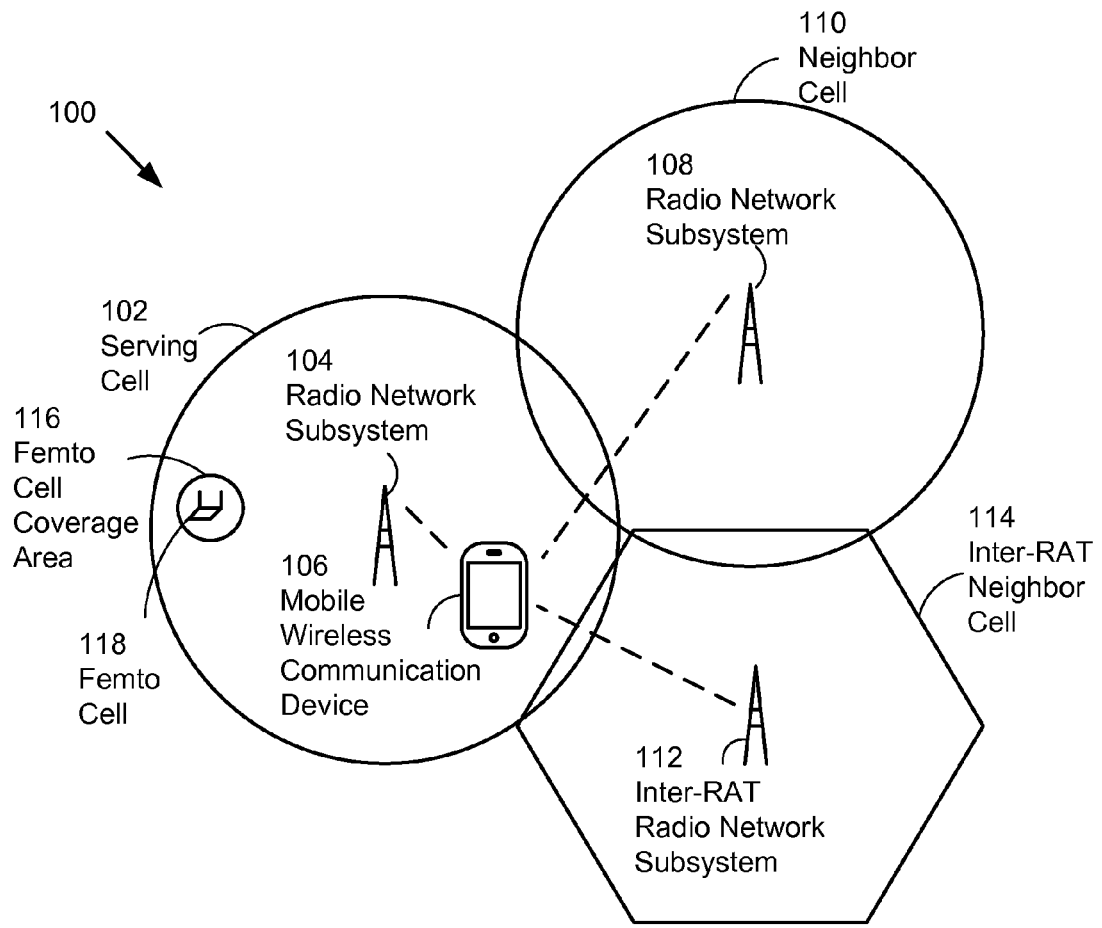
FIG. 1 illustrates a mobile wireless communication device located among multiple cells of a wireless cellular communication network.

A mobile wireless communication device 106 can include the capability to connect seamlessly with a wireless communication network 100 of overlapping wireless communication cells, each wireless communication cell covering a geographic area extending from a radio network subsystem as illustrated in FIG. 1. The mobile wireless communication device 106 can receive communication signals from radio network subsystems 104/108/112 located in different respective cells 102/110/114 in the wireless communication network 100, and each cell can be located at a different distance from the mobile wireless communication device 106. Radio network subsystems 104/108/112 can be referred to as base stations in a GSM network and as Node Bs in a UMTS network. As signal strength of a wireless communication signal decays proportionally to the square of the distance between a transmitting end and a receiving end, the mobile wireless communication device 106 can monitor the received signal strength from the several different cells 102/110/114 in the wireless communication network 100 to determine a cell having the strongest received signal at any given time. Additionally interference can vary by location so that received signal quality can change substantially as the mobile wireless communication device changes locations within the mobile wireless communication network 100. Thus the cell from which the mobile wireless communication device 106 receives the strongest signal and/or receives the signal having the highest quality can change.

After a "power on" initialization, or similarly when entering a "new" wireless communication network, the mobile wireless communication device 106 can seek to associate with a cell in the wireless communication network 100, i.e. to "select" a cell. A radio network subsystem in a cell of the wireless communication network 100 can broadcast a series of system information messages at regular intervals that identify salient characteristics of the cell in which it is located as well as certain properties of neighbor cells. Based on measurements of received signal strength, or other received signal quality metrics such as a carrier to interference ratio, the mobile wireless communication device 106 can associate with one of the radio network subsystems, such as radio network subsystem 104, thereby "selecting" a particular cell within the wireless communication network 100 as a "serving" cell 102. The process of associating with a "serving" cell can be also known as "camping" on that cell.

After associating with the serving cell 102, the mobile wireless communication device 106 can initiate connections (such as voice or data calls) with the wireless communication network 100 through the radio network subsystem 104 of the serving cell 102. The radio network subsystem 104 in the serving cell 102 can also initiate connections to the mobile wireless communication device 106, as the wireless network 100 can be aware of the association between the serving cell 102 and the mobile wireless communication device 106. While "camped" on the serving cell 102, the mobile wireless communication device 106 can monitor broadcast signals from the radio network subsystem 104 that include system information to determine if and when to associate with a different radio network subsystem, such as the radio network subsystem 108 located in the neighbor cell 110.

System information can be communicated from the radio network subsystem 104 in the serving cell 102 to the mobile wireless communication device 106 camped on the serving cell 102 through system information messages. Parameters associated with a common function can be grouped together in a system information message of a particular type. As a representative example, the third-generation (3G) mobile communication technology known as Universal Mobile Telecommunications System (UMTS), which is developed and maintained by the $3^{rd}$ Generation Partnership Project (3GPP), includes a radio resource control (RRC) protocol that organizes system information into one of a number of different system information blocks (SIBs). SIB3 and SIB4 can be broadcast by the radio network subsystem 104 and can contain parameters about the serving cell for the mobile wireless communication device 106 to use when in an idle or connected state respectively. Similarly SIB 11 and SIB12 can provide additional parameters about neighbor cells when in the mobile wireless communication device 106 is in the idle or connected state respectively.

As another representative example, the 2G GSM communications protocol broadcasts neighbor cell information in several different system information (SI) messages. The mobile wireless communication device 106 can assemble a GSM neighbor list from information broadcast in SI2, SI2bis, SI2ter and SI2quater system information messages broadcast by the radio network subsystem 104 in the mobile wireless communication network 100. The information contained in the SI messages can include a list of frequencies of neighbor cells and also base station identification codes (BSICs) paired with the neighbor cells' frequencies. The mobile wireless communication device 106 can select a neighbor cell at a different frequency (inter-frequency reselection) or a neighbor cell at the same frequency with a different BSIC (intra-frequency reselection). The SI2quater system information message can also include a 3G neighbor list with which the mobile wireless communication device 106 can select a 3G cell (inter-RAT reselection).

When the mobile wireless communication device 106 detects an out-of-service (OOS) condition, the mobile wireless communication device 106 can search for cells. The scope of a search can vary. An intra-frequency search can look for cells (or more specifically actively broadcasting radio network subsystems within cells) that use different scrambling codes for the same frequency. An inter-frequency search can look for cells that use different frequencies (with possibly the same or different scrambling codes). An inter-RAT (radio access technology) search can look for cells that use different radio access technologies. Neighbor cell lists broadcast by the radio network subsystem 104 in system information blocks can encompass any of these searches of different breadth. FIG. 1 illustrates an inter-RAT neighbor cell 114 covered by an inter-RAT radio network subsystem 112. The thresholds to switch between cells based on signal level and signal quality measurements can differ for intra-frequency, inter-frequency and inter-RAT searches.

During a cell reselection process, the mobile wireless communication device 106 can use values broadcast in SIB3/4 and SIB11/12 in order to evaluate suitability criteria for the current serving cell 102 and for neighbor cells 110/114. Suitability criteria that can be specified can include a minimum received power level (received signal strength level) and a minimum received signal quality level. The mobile wireless communication device 106 can measure a common pilot channel (CPICH) to determine a received signal code power (RSCP) as well as a signal to interference ratio (Ec/Io) and compare the determined values against the suitability criteria read from the relevant SIBs. The RSCP can be compared against the minimum received power level in the suitability criteria, while the Ec/Io can be compared against the minimum received signal quality level in the suitability criteria.

As a representative embodiment, the mobile wireless communication device 106 in a UMTS wireless communication network 100 can deem a serving cell 102 suitable if the following equations are satisfied.

$$Srxlev>0$$

$$Squal>0$$

The parameters Srxlev and Squal can be calculated as follows.

$$Srxlev=Qrxlevmeas-Qrxlevmin-Pcomp$$

$$Squal=Qqualmeas-Qqualmin$$

The parameters Qrxlevmin, Qqualmin and Pcomp can be specified by the radio network subsystem 104 using the SIB3/4 system information messages for the serving cell 102, while the parameters Qqualmeas and Qrxlevmeas can be measured by the mobile wireless communication device 106. If the serving cell 102 is found "unsuitable" over a series of consecutive DRX cycles 202, then the mobile wireless communication device 106 can initiate a cell reselection process. The number of consecutive DRX cycles that can trigger a cell reselection can be also transmitted by the radio network subsystem 104 in the SIB3/4 system information messages. The SIB3/4 system information messages can also include additional parameters Sintrasearch, Sintersearch, SinterRAT that can trigger an intra-frequency, inter-frequency or inter-"radio access technology" cell search procedure respectively if the calculated value Squal falls below a level specified by these additional parameters. Additional parameter values for evaluating suitability of neighbor cells 110/114 can be broadcast in the SIB11/12 system information messages.

In addition to the serving cell 102 and neighbor cells 110/114, FIG. 1 illustrates a femto-cell 118 having a limited cell coverage area 116. The femto-cell 118 can be a low power, simplified radio network subsystem that can be deployed indoors within a home or business environment. The femto-cell 118 deployment can overlap with the wireless communication network 100 of macro cells 102/110/114 that cover a geographic area. The femto-cell 118 can also be referred to as a "Home Node B" in a UMTS network. The femto-cell 118 can advantageously provide a high data rate connection over a limited coverage area to a restricted set of mobile wireless communication devices 106. In a representative embodiment, the femto-cell 118 can have a maximum coverage distance of less than 20 meters. The mobile wireless communication device 106 can be offloaded from the serving cell 102 to the femto-cell 118, thereby freeing radio frequency resources in the serving cell 102 for other mobile wireless communication devices to access communication services. The femto-cell 118 can provide access to connect the user of the mobile wireless communication device 106 through to the same communication services as provided by access through the wireless communication network 100 through a wired backhaul (not shown), such as a wired broadband connection.

In a representative deployment, the femto-cell 118 can use the same frequency band as one used by the macro serving cell 102, such as an 850 MHz frequency band or a 1900 MHz frequency band. The femto-cell 118 and the macro serving cell 102, however, can use different UMTS terrestrial radio access absolute radio frequency channel numbers (UARFCNs) and different primary scrambling codes (PSCs). Choosing different UARFCNs and PSCs for the macro serving cell 102 and the femto-cell 118 can avoid interference between the femto-cell 118 transmissions and the macro serving cell 102 transmissions. While UARFCNs and PSCs can be broadcast for neighbor cells 110/114 in SIB11/12, UARFCNs and PSCs for femto-cells 118 can be not broadcast by the radio network subsystem 104 in the macro serving cell 102. There can be a large number (e.g. hundreds or more) of femto-cells 118 in a dense urban environment within a single macro serving cell 102, and broadcasting the UARFCNs and PSCs for all of the femto-cells in an area can cause network planning issues. As such, the mobile wireless communication device 106 can not relay only on information broadcast by a macro serving cell 102 in order to recognize and to connect to a femto-cell 118. If the mobile wireless communication device 106 only uses neighbor cells broadcast by the radio network subsystem 104 in the macro serving cell 102 for a cell selection or reselection process, then the mobile wireless communication device can connect to an inter-RAT neighbor cell 114 rather than to a femto-cell 118 as described next.

Figure 2:
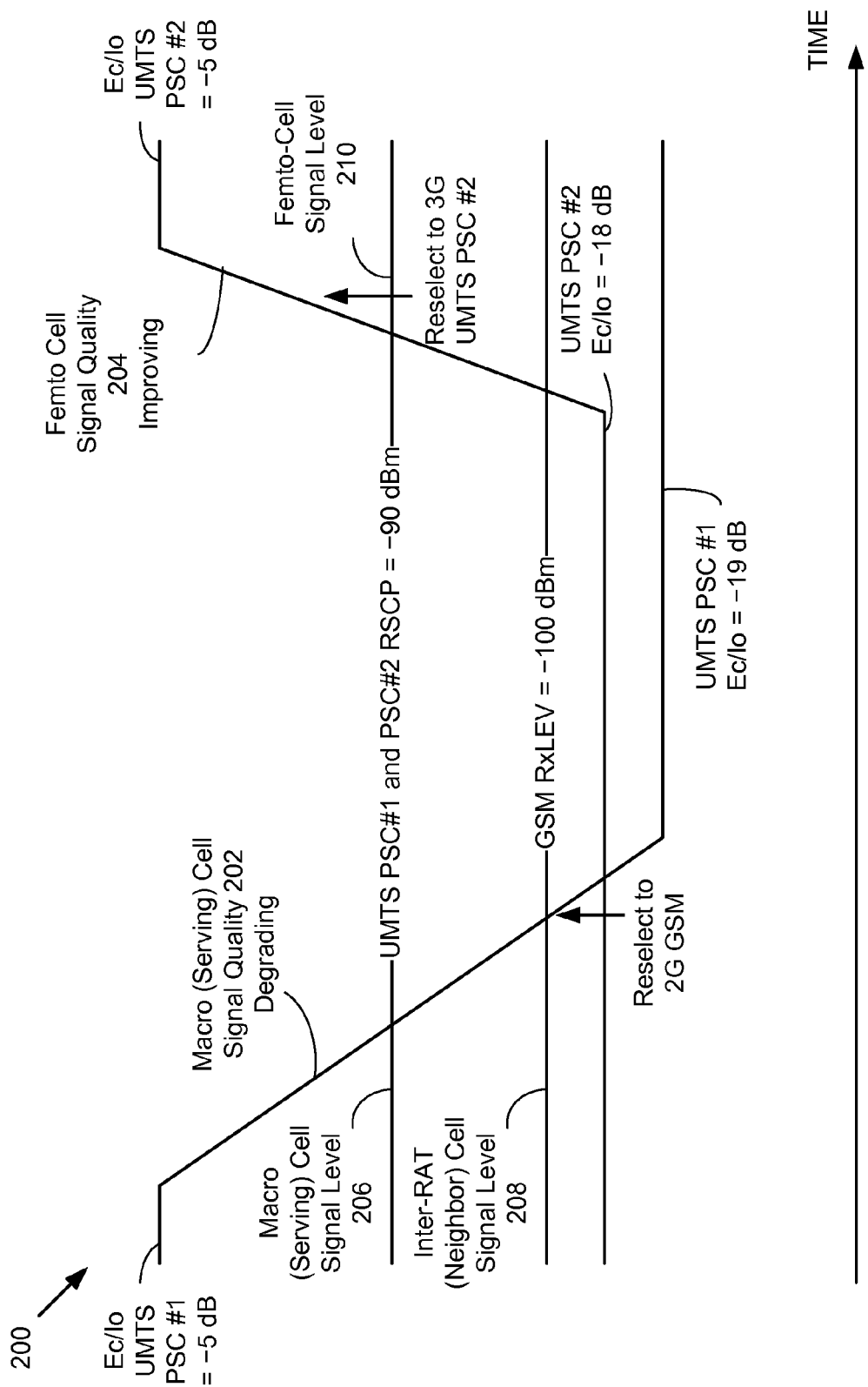
FIG. 2 illustrates received signal levels and received signal qualities measured at a mobile wireless communication device from three different cells that use two different radio access technologies.

FIG. 2 illustrates a reselection scenario 200 based on received signal metrics measured at the mobile wireless communication device 106 for a macro serving cell 102, an inter-RAT neighbor cell 114 and a femto-cell 118. The mobile wireless communication device 106 can measure a degrading signal quality 202 of the macro serving cell 102 that can start at a level that satisfies a set of suitability criteria and can fall to a level that causes a reselection process to occur. In a representative embodiment, the macro serving cell 102 can be within a UMTS communication network 100. The mobile wireless communication device 106 can measure an Ec/Io signal quality metric (Qqualmeas) for a first primary scrambling code (PSC #1) having a value of −5 dB for the macro serving cell 102 initially. This Ec/Io signal quality metric level can exceed the signal quality metric minimum Qqualmin broadcast by the macro serving cell 102, so that the suitability criteria Squal>0 for the macro serving cell 102 can be satisfied. The mobile wireless communication device 106 can also measure a received signal level 206 (Qrxlevmeas) for a primary scrambling code (PSC #1) of the macro serving cell 102 having a value of −90 dBm, which can satisfy the suitability criteria Srxlev>0. When the Ec/Io signal quality metric level remains sufficiently high to ensure that the suitability criteria Squal>0 is met (and when the second suitability criteria Srxlev>0 is simultaneously met), the mobile wireless communication device 106 can remain connected to the macro serving cell 102.

When the Ec/Io signal quality metric of the macro serving cell 102 degrades as shown by the down slope 202 in FIG. 2, the suitability criteria Squal>0 can be not met, and a reselection process can start. The measured macro serving cell 102 signal quality metric Ec/Io UMTS PSC #1 can degrade 202 to a level below which the suitability criteria Squal>0 can be not met, i.e. Qqualmeas<Qqualmin can indicate that the measured signal quality level falls below the minimum signal quality level required by macro serving cell 102. Even though the received signal code power (RSCP), which can be a measure of received signal level (Qrxlevmeas), of the first primary scrambling code (PSC #1) of the serving cell 102 can remain constant at −90 dBm as shown in FIG. 2 (and can thus satisfy the suitability criteria Srxlev>0), the degraded measured signal quality Ec/Io can still trigger a cell reselection process. The macro serving cell 102 can be "unsuitable" when one of the two suitability conditions Srxlev>0 and Squal>0 can be not met.

The mobile wireless communication device 106 can measure a received signal level Qrxlevmeas of an inter-RAT neighbor cell 114 (Rxlev of a 2G GSM cell in the representative embodiment shown) having a constant level of −100 dBm. When this level satisfies the suitability criteria Srxlev>0, the mobile wireless communication device can reselect to the inter-RAT neighbor cell 114. (2G GSM cells can be not measured against received signal quality criteria Squal>0, so a sufficiently high received signal level (Rxlev) alone can suffice.) Once camped on the inter-RAT neighbor cell 114, the mobile wireless communication device 106 can continuously search for a 3G UMTS cell that can provide a better (e.g. higher throughput) service. The search for a 3G UMTS cell can use a neighbor list of cell information broadcast by the current inter-RAT cell 114; however, the neighbor list can exclude femto-cells. The search can also use other primary scrambling codes not included in the neighbor list of the current inter-RAT cell 114 (nor included in the neighbor list of the previous macro serving cell 112). For example, the mobile wireless communication device can locate a 3G UMTS femto-cell 118 that uses primary scrambling code PSC #2. The strength of the received signal code power (RSCP) for the PSC #2 can be equal to −90 dBm and can meet a required the received signal level suitability criteria Srxlev>0. When a measured signal quality (Ec/Io UMTS PSC #2) for the femto-cell 118 exceeds the level required for the received signal quality suitability criteria Squal>0, the mobile wireless communication device 106 can reselect to the 3G UMTS femto-cell 118 from the 2G (inter-RAT neighbor) GSM cell 114. The delay incurred to reselect to the femto-cell 118 due to camping on the 2G inter-RAT neighbor cell 114 can be avoided by including stored cell lists during the cell search. Under certain received signal level and qualities conditions, the mobile wireless communication device 106 can remain connected to the 2G GSM cell 114; in which case, the mobile wireless communication device can be not camped on a cell that uses a better radio access technology (e.g. 3G UMTS over 2G GSM).

Figure 3:
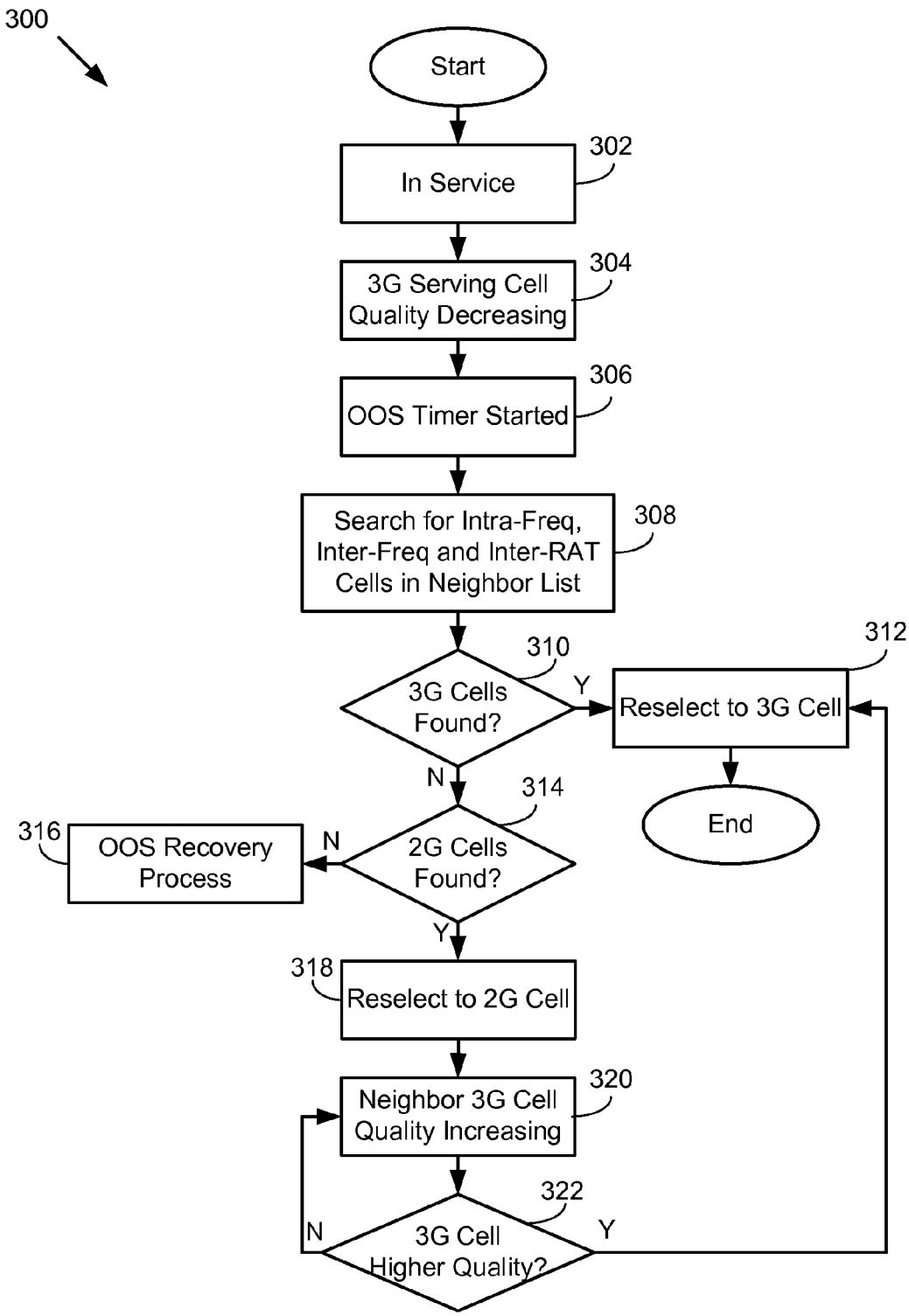
FIG. 3 illustrates a prior art method for performing cell search and selection.

FIG. 3 outlines a prior art method 300 for cell reselection. The mobile wireless communication device 106 can initially be connected to the 3G UMTS serving cell 102 in step 302 (in service). In step 304, the 3G UMTS serving cell 102 signal quality received by the mobile wireless communication device 106 can decrease to a level below that required for cell suitability. An out of service (OOS) timer can start in step 306 and upon expiration of the OOS timer, in step 308, the mobile wireless communication device 106 can search for cells using a broadcast neighbor list. The search can include cells using the same frequency but different scrambling codes (intra-frequency search), cells using a different frequency (inter-frequency search) and cells using different radio access technologies (inter-RAT). If any 3G UMTS neighbor cells are found in step 310 to have suitable quality and signal level, then the mobile wireless communication device 106 can reselect to the 3G UMTS cell in step 312, and the search and reselection process can terminate.

Found cells can satisfy cell suitability criteria for reselection as specified in system information blocks previously broadcast by the 3G UMTS serving cell 102. If no suitable 3G UMTS cells are found in step 310, then if any suitable 2G GSM cells are found in step 314, the mobile wireless communication device 106 can reselect to the suitable 2G GSM cell in step 318. (The 2G GSM cell can be a representative example of an inter-RAT neighbor cell 114.) If no suitable 2G GSM cells are found in step 314, then an out of service (OOS) recovery process can occur in step 316, which can conduct a broader search for cells (not shown) including those not broadcast by the previously associated 3G UMTS serving cell 102. Once the mobile wireless communication device 106 camps on the 2G GSM cell, when a neighbor 3G UMTS cell quality increases in step 320 to the point that the neighbor 3G UMTS cell provides higher quality than the current serving 2G GSM cell on which the mobile wireless communication device 106 is camped (as determined in step 322), the mobile wireless communication device 106 can reselect to the neighbor 3G cell in step 312. The intermediate steps of selecting and camping on a 2G GSM cell rather than selecting directly to a 3G UMTS cell (e.g. to one not found in a broadcast neighbor list) can be avoided using a new method as described next.

Figure 4:
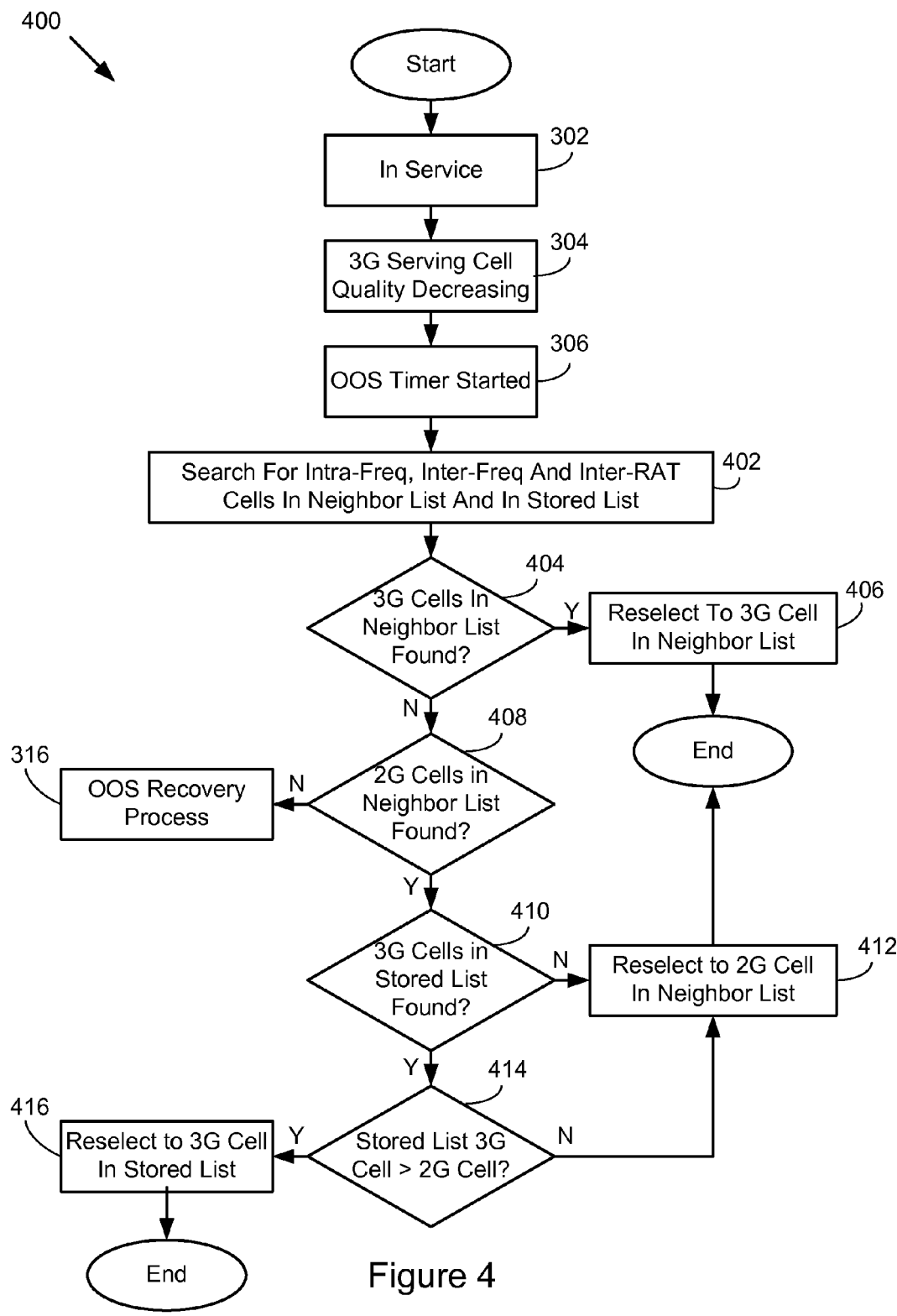
FIG. 4 illustrates a representative method for performing cell search and selection using an expanded set of cells.

FIG. 4 illustrates a method 400 for cell reselection that modifies the method 300 described for FIG. 3 to expand the set of cells searched and used for reselection. In addition to neighbor cells previously broadcast by the 3G UMTS serving cell 102, in step 402, the mobile wireless communication device 106 can also search for cells from a list stored in the mobile wireless communication device 106. The stored list can be kept by the mobile wireless communication device 106 based on previously located and/or known cells and can include their frequencies and primary scrambling codes. In step 404, if any 3G UMTS cells from the neighbor list are located and found suitable, then the mobile wireless communication device 106 can reselect to the 3G UMTS cell from the neighbor list in step 406. If however, no 3G UMTS cells from the neighbor list are located and found suitable in step 404, then the mobile wireless communication device can continue to search for additional cells with which to reselect.

Following the 3G UMTS cells in the neighbor list, the mobile wireless communication device 106 can check for suitable 2G GSM cells in the neighbor list in step 408. If no 2G GSM cells from the neighbor list are found suitable in step 408, then the mobile wireless communication device can enter an out of service recovery process in step 316 that can expand the search to additional cells. If a 2G GSM cell from the neighbor list is found suitable in step 408, then the mobile wireless communication device 106 can first determine if a 3G UMTS cell from the stored list is found suitable in step 410. This can avoid reselecting to a 2G GSM cell when a 3G UMTS cell is available and also suitable for connection. Thus, a 3G UMTS cell from the stored list can be prioritized over a 2G GSM cell from the neighbor list. The 3G UMTS cell from the stored list can be compared against the 2G GSM cell in step 414 and the mobile wireless communication device can connect to the "better" cell. Cell suitability criteria can be used to compare the two cells. If the 3G UMTS cell in the stored list is better than the 2G GSM cell in the neighbor list, then the mobile wireless communication device 106 can reselect to the 3G UMTS cell in the stored list in step 416. Otherwise, the mobile wireless communication device 106 can reselect to the 2G GSM cell from the neighbor list in step 412. By including a stored list of 3G UMTS cells not broadcast by cells in the wireless communication network, the mobile wireless communication device 106 can expand the cell search and selection process to include "private" femto-cells that can offer a higher data rate 3G UMTS connection rather than to a lower data rate 2G GSM connection.

Figure 5:
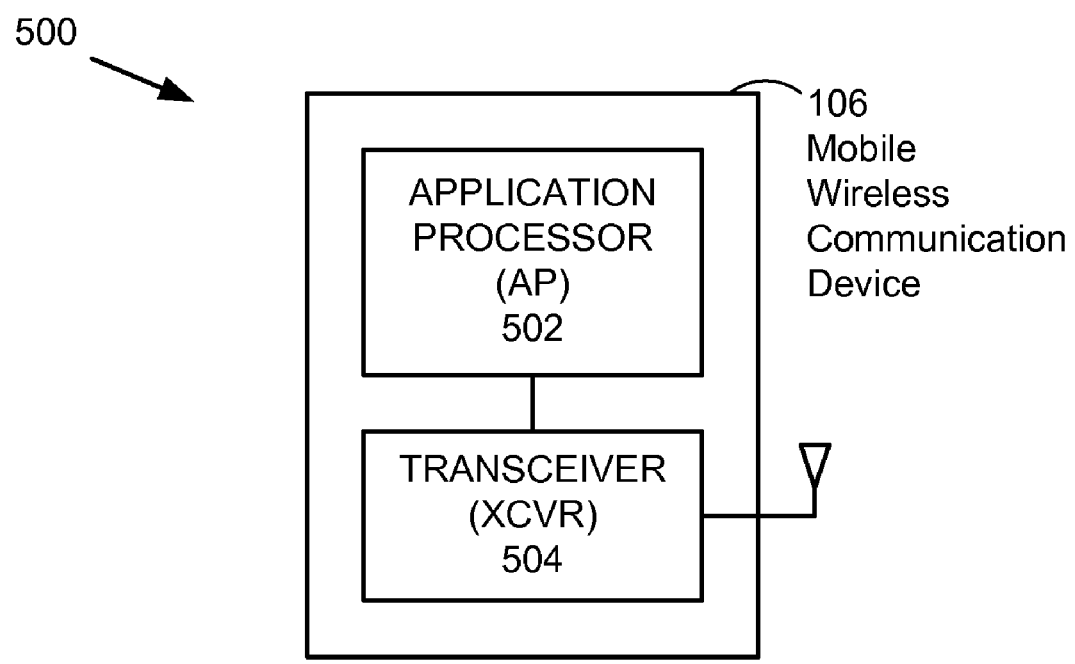
FIG. 5 illustrates processing units of the mobile wireless communication device.

FIG. 5 illustrates a representative embodiment 500 of the mobile wireless communication device 106 including internal processing units. An application processor 502 in the mobile wireless communication device can perform higher layer functions, such as maintaining an IP stack, request and releasing data connections, and providing application services. A transceiver 504 in the mobile wireless communication device 106 can transmit and receive lower layer packets that correspond to high layer signaling and data packets transmitted through a radio "air" interface to the radio network subsystem 104 in the wireless communication network 100. The transceiver 504 can search for and located cells suitable reselection. Suitability criteria and other information about cells can be broadcast by radio network subsystems 104/108/112 in cells in the wireless communication network 100, including both the macro serving cell 102 and neighbor cells 110/114. The mobile wireless device 106 can assemble neighbor lists based on information broadcast by the radio network subsystems 104/108/112. Information about private cells, such as the femto cell 118, can be not broadcast by the radio network subsystems 104/108/112, and the mobile wireless communication device 106 can maintain stored lists of "private" cells based on information provided through other means. For example, information about private cells can be manually entered, pre-stored, communicated through control messages or stored from previous connections. Information about cells in the neighbor list or cells in the stored list can include a transmit frequency band, a carrier frequency, a primary scrambling code and a geographic location. In some embodiments, the application processor 502 and the transceiver 504 can be separate devices, while in other embodiments, the functions performed by the application processor 502 and the transceiver 504 can be combined in a single device.

Figure 6:
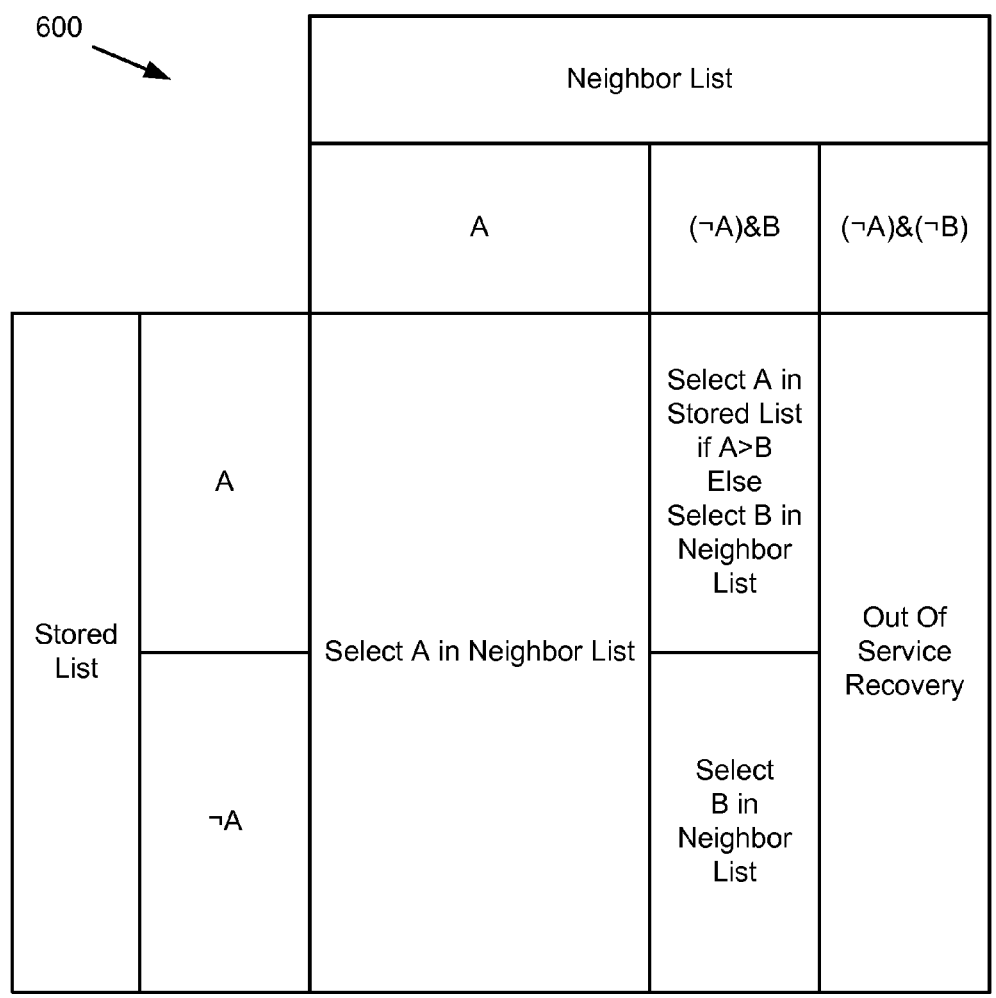
FIG. 6 illustrates a representative set of selection actions taken by the mobile wireless communication device.

FIG. 6 summarizes in a table 600 a set of selection actions that the mobile wireless communication device 106 can take in response to a search for suitable cells after a loss of service. The mobile wireless communication device 106 can include a stored list of cells and an assembled neighbor list of cells. The cells can be candidates for selection, and each cell can use a particular radio access technology (RAT), either an A RAT or a B RAT. The A RAT can be preferred to the B RAT, for example if the A RAT is 3G UMTS, while the B RAT is 2G GSM. Preference can be based on a more advanced generation of wireless telecommunications technology used, or based on a maximum data rate achievable with the technology, or based on a ranked preference set by a user of the device (or by the wireless communication network) and stored in the mobile wireless communication device 106. The mobile wireless communication device 106 can search for and locate one or more cells in the neighbor list and in the stored list by scanning for received signals in different radio frequency bands. Following the search, the mobile wireless device 106 can determine whether one or more of the found cells are suitable for selection based on a received set or stored set of suitability criteria. In FIG. 6, the notation A can indicate a suitable cell is found that uses the A RAT, while the notation B can indicate a suitable cell is found that uses the B RAT. The notation ¬ A can indicate that no suitable cell is found that uses the A RAT, while the notation ¬ B can indicate that no suitable cell is found that uses the B RAT.

The mobile wireless communication device 106 can locate suitable cells using the A RAT or the B RAT in either the neighbor list or the stored list or both. When a suitable cell in the neighbor list using the preferred A RAT is found, the mobile wireless communication device 106 can select the A cell. When no suitable cell using the A RAT or the B RAT is found in the neighbor list, the mobile wireless communication device 106 can initiate an out of service recovery process.

When a suitable B cell is found in the neighbor list but no suitable A cell is found in the neighbor list or in the stored list, the mobile wireless communication device can select the non-preferred suitable B RAT cell found in the neighbor list. When a suitable A cell is found in the stored list and no suitable A cell is found in the neighbor list, then the mobile wireless communication device 106 can consider the preferred A RAT cell in the stored list. The mobile wireless communication device 106 can compare a performance metric, such as a received signal strength or a received signal quality, for both cells and select the higher performing cell. For example, if the stored list A cell outperforms the neighbor list B cell, then the mobile wireless communication device 106 can select the preferred RAT suitable A cell in the stored list. If the neighbor list B cell, however, outperforms the stored list A cell, the suitable B cell in the neighbor list can be selected over the preferred RAT A cell in the stored list. By including stored list cells in the search, the mobile wireless communication device 106 can connect to a higher performing and/or more recent generation radio access technology cell. The mobile wireless communication device 106 can avoid camping on lower performing or older generation radio access technology cells when a better performing cell can be available, even when information about the better performing cell is not broadcast by the wireless communication network 100.

Various aspects of the described embodiments can be implemented by software, hardware or a combination of hardware and software. The described embodiments can also be embodied as computer program code on a computer readable medium. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for expanded cell search and selection in a mobile wireless communication device, the method comprising:
in a mobile wireless communication device,
searching for and locating cells in a first list of neighbor cells and a second list of stored cells;
evaluating the located cells using suitability criteria;
when locating a suitable first cell that uses a first radio access technology in the first list of neighbor cells, selecting the first cell; otherwise
when locating a suitable second cell that uses a second radio access technology in the first list of neighbor cells and not locating a suitable cell that uses the first radio access technology in the second list of stored cells, selecting the second cell; otherwise
when locating a suitable third cell that uses the second radio access technology in the first list of neighbor cells, and locating a suitable fourth cell that uses the first radio access technology in the second list of stored cells, and the fourth cell is more suitable than the third cell, selecting the fourth cell,
wherein the mobile wireless device assembles the first list of neighbor cells based on information broadcast by one or more network subsystems in a wireless communication network, and the second list of stored cells includes information for at least one cell not broadcast by the wireless communication network.

2. The method as recited in claim 1 further comprising:
when not locating a suitable cell that uses the first or second radio access technologies in the first list of neighbor cells, initiating an out of service recovery process.

3. The method as recited in claim 1, wherein the first radio access technology is preferred to the second radio access technology.

4. The method as recited in claim 3, wherein a radio access technology preference is determined by a maximum achievable data transfer rate.

5. The method as recited in claim 3, wherein the second radio access technology is a 2G GSM technology and the first radio access technology is a 3G UMTS or later generation technology.

6. The method as recited in claim 1, wherein the first list of neighbor cells is broadcast by a radio network subsystem in a wireless communication network, and the second list of stored cells is not broadcast by the radio network subsystem.

7. The method as recited in claim 6, wherein the fourth cell is a femto cell, and the radio network subsystem does not broadcast the primary scrambling code of the femto cell.

8. An apparatus for expanded cell search and selection in a wireless communication network, the apparatus comprising:
an application processor configured to provide an application service; and
a transceiver configured to:
detect a loss of service condition;
search for and locate cells in a first list of neighbor cells and a second list of stored cells;
assemble the first list of neighbor cells based on information broadcast by one or more network subsystems in a wireless communication network, and the second list of stored cells includes information for at least one cell not broadcast by the wireless communication network;
evaluate the located cells using suitability criteria; and
select a suitable first cell that uses a first radio access technology in the second list of stored cells, when not locating a suitable cell that uses the first radio access technology in the first list of neighbor cells, and when locating a suitable second cell that uses a second radio access technology in the first list of neighbor cells, the second cell being inferior to the first cell.

9. The apparatus as recited in claim 8, wherein the transceiver is further configured to select a suitable cell that uses the first radio access technology in the first list of neighbor cells, irrespective of suitable cells located in the second list of stored cells.

10. The apparatus as recited in claim 8, wherein the transceiver is further configured to initiate an out of service recovery process when no located cell that uses the first or second radio access technology in the first list of neighbor cells satisfies the suitability criteria.

11. The apparatus as recited in claim 8, wherein the transceiver is further configured to select a suitable cell that uses the second radio access technology in the first list of neighbor cells when no located cell that uses the first radio access technology in the first list of neighbor cells or in the second list of stored cells satisfies the suitability criteria.

12. The apparatus as recited in claim 8, wherein the first radio access technology is preferred to the second radio access technology.

13. The apparatus as recited in claim 12, wherein preference is based on a later generation radio access technology.

14. The apparatus as recited in claim 8, wherein information about the suitable first cell is the second list of stored cells is not broadcast by any of the located cells.

15. The apparatus as recited in claim 8, wherein the suitable first cell is a private cell having a limited transmission range of less than 20 meters coverage.

16. A non-transitory computer readable medium for storing non-transitory computer program code executable by a processor in a mobile wireless device for searching for and selecting a suitable cell, the non-transitory computer readable medium comprising:
   non-transitory computer program code for locating and evaluating cells in a first list of neighbor cells and in a second list of stored cells using suitability criteria;
   non-transitory computer program code for selecting a first suitable cell in the second list of stored cells, the first suitable cell using a first radio access technology, when no suitable cell that uses the first radio access technology is found from the first list of neighbor cells, and when the first suitable cell from the second list of stored cells outperforms all suitable cells found from the first list of neighbor cells; and
   non-transitory computer program code for assembling the first list of neighbor cells based on information broadcast by one or more network subsystems in a wireless communication network, and the second list of stored cells includes information for at least one cell not broadcast by the wireless communication network.

17. The non-transitory computer readable medium as recited in claim 16, further comprising:
   non-transitory computer program code for locating and selecting a suitable cell from the first list of neighbor cells, the suitable cell using the first radio access technology.

18. The non-transitory computer readable medium as recited in claim 16, further comprising:
   non-transitory computer program code for initiating an out of service recovery process when no suitable cell is located from the first list of neighbor cells.

19. The non-transitory computer readable medium as recited in claim 16, further comprising:
   non-transitory computer program code for selecting a suitable cell in the first list of neighbor cells that uses a second radio access technology when no suitable located cell that uses the first radio access technology is found in the first list of neighbor cells or in the second list of stored cells.

20. The non-transitory computer readable medium as recited in claim 16, wherein the first radio access technology provides a higher performing connection to the mobile wireless device than the second radio access technology.

21. The non-transitory computer readable medium as recited in claim 16, wherein the second list of stored cells includes information about the stored cells not broadcast by the located cells.

22. The non-transitory computer readable medium as recited in claim 16, wherein the first radio access technology uses a 3G or later generation communications protocol and the second radio access technology uses a 2G or earlier generation communication protocol.

23. The non-transitory computer readable medium as recited in claim 16, wherein the first suitable cell is a private cell with characteristics not broadcast by an overlapping macro cell, the private cell having limited transmission coverage range.

* * * * *